Sept. 11, 1934.   J. R. REPLOGLE   1,973,103
REFRIGERANT COMPRESSOR VALVE
Filed June 6, 1932   2 Sheets-Sheet 2
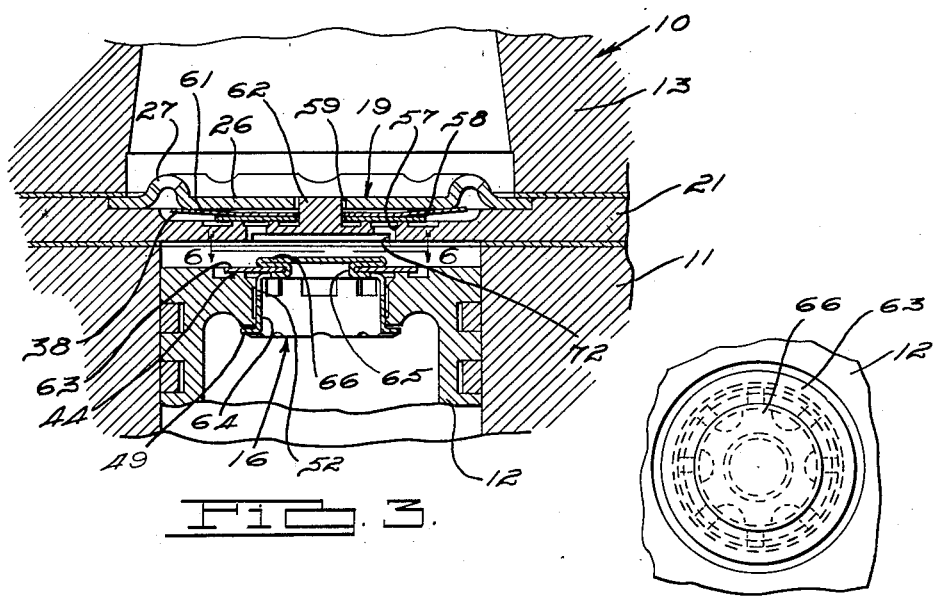
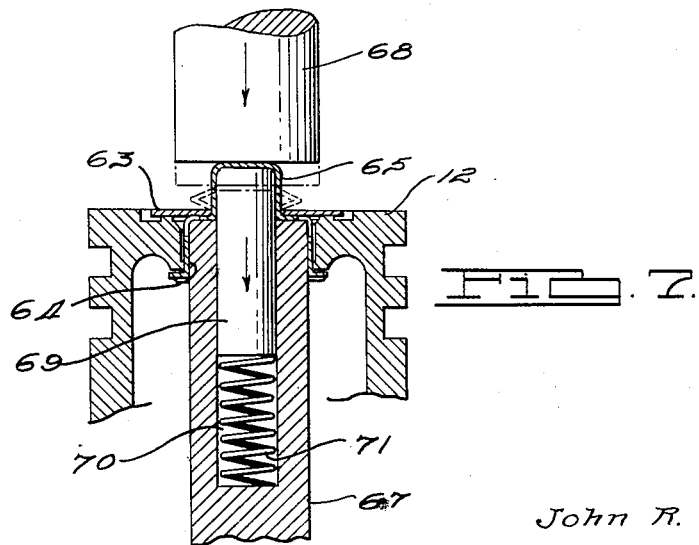
INVENTOR
John R. Replogle.
BY
ATTORNEYS.

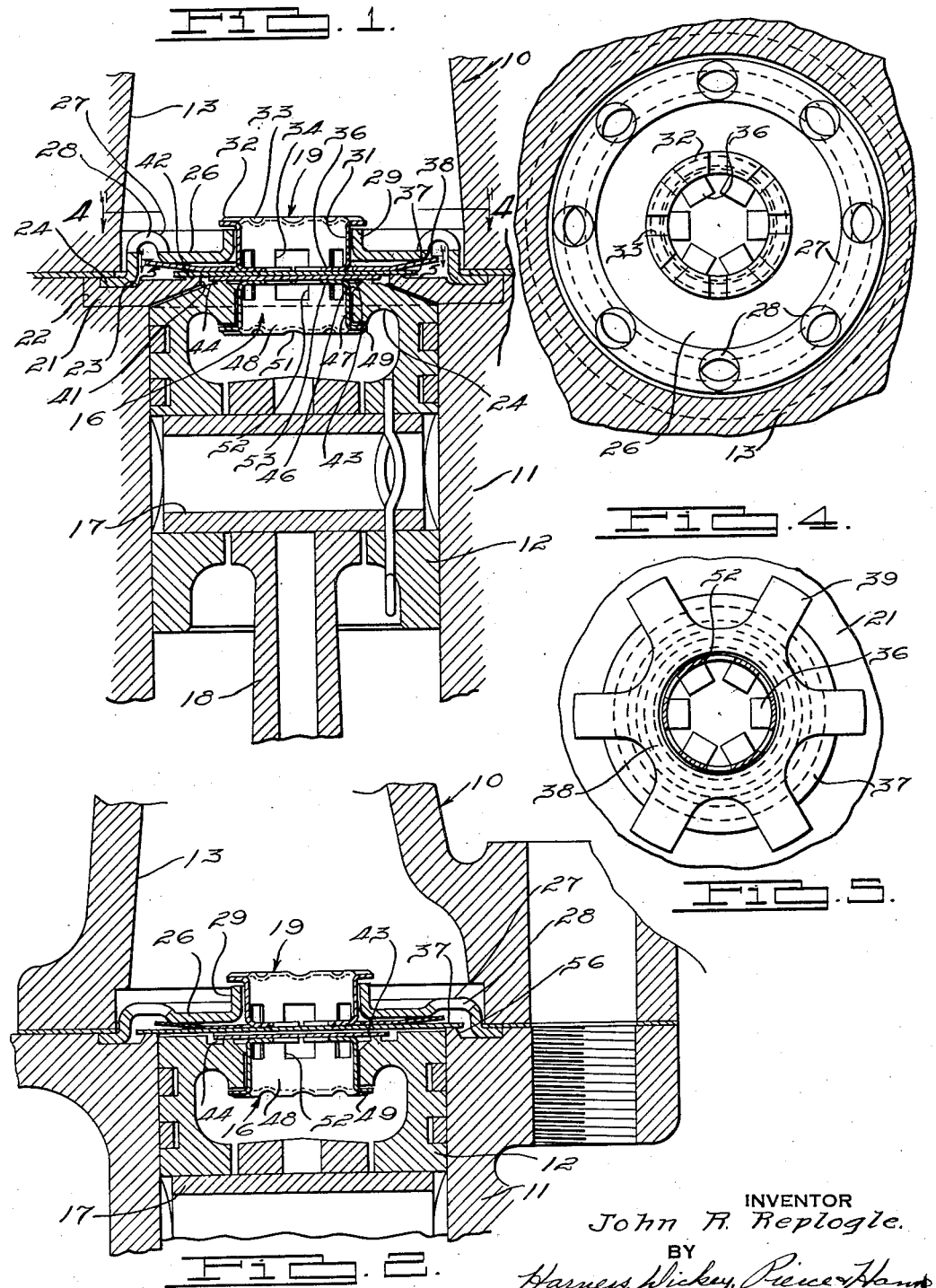

Patented Sept. 11, 1934

1,973,103

UNITED STATES PATENT OFFICE 1,973,103

REFRIGERANT COMPRESSOR VALVE

John R. Replogle, Detroit, Mich., assignor, by mesne assignments, to Copeland Refrigeration Corporation, Mount Clemens, Mich., a corporation of Michigan Application June 6, 1932, Serial No. 615,514

10 Claims. (Cl. 230—190)

This invention relates to the construction of compressors and has particular relation to valve structures for employment in compressors applicable for use in small refrigerating machines.

An object of the invention is to provide a quiet, efficient and inexpensive fluid compressing mechanism suitable for being directly driven at relatively high speeds by electric motors employed in the condensing mechanisms of small domestic or commercial refrigerating machines.

Another object of the invention is to provide a compressor having valves secured permanently in removable parts thereof so that the valves can be assembled in the parts outside of the compressor and thereafter when the compressor parts are assembled the mechanism is entirely ready for operation.

Another object of the invention is to provide a compressor having a removable valve plate in which is permanently secured a valve consisting of two sheet metal parts secured permanently together therein in such manner that the valve and valve plate serve as an integral unit.

Another object of the invention is to provide a piston for small refrigerant compressors having secured in the head thereof a valve consisting of two sheet metal parts permanently secured in the piston for operation therewith as an integral unit.

Another object of the invention is to be able to manufacture valves for refrigerant compressors as an integral part of some other unit of mechanism; it being thus rendered possible to manufacture compressor units containing valves which are already ground and adjusted for operation and thus when the units are assembled with the other parts of a compressor the valves already assembled therein are ready for operation without further attention.

Another object of the invention is to manufacture valves for refrigerant compressors as an integral part of some other unit mechanism of a compressor and in such manner that an entire valve and unit assembly is so cheaply manufactured that the assembly can be scrapped and a new unit substituted therefor, in the event any part thereof should become defective.

Another object of the invention is to provide a refrigerant compressor wall with a disc valve integrally secured to a tubular retaining member through which the working fluid operated upon by the compressor flows upon the operation of the disc for permitting the passage of working fluid through the wall.

Another object of the invention is to provide, in a wall of a refrigerant compressor, a valve having a flanged tubular retaining member secured permanently thereto with a flanged portion thereof engaging the side of the wall opposite the valve and with the working fluid of the compressor passing through the tubular member upon the operation of the valve.

Another object of the invention is to devise a method of manufacturing compressor parts containing valves for controlling the flow of working fluid therein.

The invention comprises generally a compressor having a head and valve plate secured rigidly upon the open end of a cylinder containing a reciprocating piston operating between the lower end of the cylinder and the valve plate closing the upper end thereof. While the compressor may be designed to discharge compressed fluid through the piston head into the compressor crankcase associated with the cylinder, in the present instance it is so designed that the working fluid compressed within the cylinder is discharged through a discharge valve associated with the aforesaid valve plate. The valve plate is provided with one or more discharge openings therethrough and through which the flow of fluid is controlled by a disc or flexible valve arranged on a seat surrounding the opening. The disc is adapted to be resiliently urged against the seat by a spring confined between the upper surface thereof and a cage supported upon the valve plate above the aforesaid recess and secured in position therein by engagement with the lower edge of the compressor head.

In one form of the invention the disc, valve, spring and cage all are concentrically located within a recess in the upper surface of the valve plate by a projection formed on the valve plate and extending through openings formed centrally of the aforesaid element.

In another form of the invention the disc and spring are centrally located relative to the cage by a tubular member extending through the cage and welded to the disc adjacent the central portion thereof.

In still another instance the valve plate is entirely eliminated from the structure and a disc is employed to cover the entire upper open end of the cylinder against which the working fluid therein is compressed. In such event the disc is held in position as before by a tubular member extending through the cage and spring which is welded to the disc centrally thereof.

In order to provide for the least possible amount of clearance space between the piston and the structure in the end of the cylinder embracing the discharge valve the head end of the piston is formed in such manner as to closely fit the parts of the structure adjacent the upper extremity of its travel.

For admitting working fluid to the cylinder the piston is provided with a suction valve formed in the head end thereof and secured rigidly in an axial opening extending therethrough. The suction valve comprises a disc adapted to rest upon an angular seat formed in the upper surface of the head of the piston and is secured in position by a tubular member extending through the aforesaid opening in the head and provided with a flange for preventing the displacement of the valve beyond the aforesaid seat to a greater extent than is desirable The tubular member is provided with openings through which the working fluid passes to the compressor cylinder and which also permits a certain amount of expansion and contraction between the tubular member and the disc without injury to either.

In one of the forms of the invention, the tubular member is secured to the disc by welding the two elements together while in another form the tubular member is provided with a projecting end portion adapted to extend through an opening in the disc and later to be compressed against the upper surface thereof by expanding the sides of the projection to provide an expanded head portion.

In the drawings:

Figs. 1, 2 and 3 are fragmentary longitudinal cross sectional views through compressor structures embracing the principles of the invention;

Fig. 4 is a fragmentary cross sectional view of the compressor structure illustrated by Fig. 1 as it might appear substantially upon the line 4—4 thereof;

Fig. 5 is another fragmentary cross sectional view of the compressor structure illustrated by Fig. 1 except that the latter is taken substantially upon line 5—5 thereof;

Fig. 6 is a fragmentary view of the compressor structure illustrated by Fig. 3 as the latter might appear substantially upon the line 6—6 thereof;

Fig. 7 is a view illustrating a method of assembling a part of the compressor structure illustrated by Fig. 3.

Referring particularly to the drawings, there is illustrated in Figs. 1, 2 and 3 a compressor 10 comprising principally a cylinder 11 having a reciprocating piston 12 therein and the upper end of which is closed by a head 13. The pistons 12 have head portions 14 in which suction valves 16 are secured and are provided with pins 17 by which the pistons are operated by connecting rods 18. In each instance the connecting rods are connected at the opposite ends thereof to crankshafts or other equivalent means contained within crankcases (not shown) and which are driven directly by electric motors adapted to operate at comparatively high speeds for compressors of this character. Each of the compressors 10 is provided with a discharge valve 19 which in the structures disclosed by Figs. 1 and 3 are employed in combination with valve plates 21 secured between the heads 13 and the cylinders 11.

Referring particularly to the structure disclosed by Figs. 1, 4 and 5 the valve plate 21 employed therein is considerably smaller in diameter than either the head 13 or the top flange of the cylinder 11 and is adapted to be supported in the upper end of the cylinder in a groove 22 formed around the inner part of the cylinder at the upper extremity thereof. Just below the inner edge of the head 13, the valve plate 21 is provided with an annular recess 23 in which is secured the flanged outer edge 24 of a valve cage 26. Inside the flange 24 the cage is provided with an upwardly projecting annular bead 27 in which is formed a plurality of spaced openings 28 which provide continuously open communication between the space beneath the cage 26 and the interior of the head 13.

Formed around an opening through the center of the cage 26 is an upwardly projecting flange 29 in which is slidably disposed a tubular member 31 having an outwardly projecting flange 32 at the upper extremity thereof for engaging the outer edge of the flange 29 for limiting the movement of the tubular member inwardly of the cage. The flange 32 is provided with a plurality of radially formed corrugations 33 which limit the amount of surface of the flange 32 in contact with the end of the flange 29 thus preventing the two elements from adhering to one another by reason of the oil employed in the system. The tubular member 31 adjacent the lower extremity thereof is provided with a plurality of openings 34 formed in spaced relation therearound and at the lower end of the tubular member the arcuate portions thereof between the openings 34 are turned radially inwardly to provide lug portions 36 adapted to be welded or otherwise secured to the central portion of a circular and resilient diaphragm or disc 37. The upper portion of the disc 37 outside the tubular member 31 is adapted to be engaged by the central annular portion of a spring 38, the outer edge of which is formed to provide a plurality of arcuate and radially disposed sections 39 extending upwardly from the disc 37 and into engagement with the cage 26 in the region thereof at the inner edge of the bead 27.

The portion of the cage 26 between the flange 29 and the bead 27 is offset laterally to one side of the flange 24 in order to provide a space between the valve plate 21 and the cage for the reception of the disc 37 and spring 38.

The valve plate 21 has a relatively large opening 41 formed centrally thereof which is surrounded by an upwardly projecting and annular valve seat 42 adapted to engage and to support the lower surface of the disc 37 in the region thereof just inside the outer periphery.

The lower surface of the valve plate 21 inside the annular seat 42 and the upper surface of the piston head 14 outside the annular seat 44 are correspondingly tapered toward the upper extremity of the opening within the cylinder 11 to provide within the cylinder the least possible amount of clearance space.

In the opening 41 just inside the annular seat 42 is disposed a second resilient disc 43 forming a part of the suction valve 16 and which is adapted to rest upon an annular seat 44 formed in the upper surface of the piston 12 just inside the outer extremity of the disc 43.

While the disc 43 does not engage the disc 37 under normal circumstances, the upper surface thereof is disposed just below the plane of the upper surface of the annular seat 42 in order to provide the least possible clearance space between the two elements.

Just inside the annular seat 44, in the piston head 14, is a tapering opening 46 which terminates in a cylindrical opening 47 extending entirely through the piston head 14. Inside the opening 47 there is slidably disposed a tubular member 48 having an outwardly projecting annular flange 49 engaging the lower extremity of the portion of the head 14 surrounding the opening 47 and in which is formed a plurality of radially disposed depressions or corrugations 51 to prevent a large portion of the flange from engaging the adjacent surface of the piston head. The tubular member 48 is provided with openings 52, similar to the openings 34 in the tubular member 31, which provide sections in the tubular member which are bent radially to provide lugs 53 which are welded or otherwise secured to the disc 43.

The length of the tubular member 48 is such that a slight clearance is provided between the flange 49 and the inner edge of the piston head 14 which permits the disc 43 to rise off the annular seat 44 on the down stroke of the piston 12 to admit to the cylinder above the piston the working fluid upon which the compressor acts. Such fluid is admitted to the cylinder through the openings 52 in the tubular member, through the space within the tapering surface 46 and between the annular seat 44 and the disc 43.

After the downward stroke of the piston is completed and the piston moves upwardly within the cylinder, the disc 43 is again seated upon the annular seat 44 and the working fluid within the cylinder is thereafter compressed until the pressure within the cylinder exceeds that within the head 13 by an amount sufficient to compress the spring 38. Thereafter the disc 37 moves away from the seat 42 and the working fluid within the cylinder is expelled through the space between the lower surface of the disc 37 and the seat 42.

When the piston reaches its upper limit of travel the spring 38 again causes the disc 37 to rest upon the annular seat 42 and thus to prevent the escape from the interior of the head 13 of the working fluid previously discharged thereinto.

The structure disclosed by Fig. 2 is very similar to that disclosed by Fig. 1 and wherever applicable the same reference numerals are employed on the corresponding elements of the structure. The valve plate 21 is not employed in the structure enclosed by Fig. 2 but instead thereof the disc 37 extends entirely across the bore of the cylinder 11 and is seated on an annular seat 56 formed around the upper edge of the cylindrical opening in which the piston 12 is disposed. The valve cage 26 is directly secured between the head 13 and the cylinder 11 in an annular groove formed between such elements, in the cylinder 11 and immediately outside the annular seat 56. The structure is otherwise similar in construction and operation to that disclosed by Fig. 1.

In the structure disclosed by Fig. 3 the valve plate 21 extends entirely across the top flange of the cylinder 11 and has formed therein between the interior of the cylinder 11 and the head 13 a circular group of openings 57 which communicate with the head side of the valve plate 21 between a pair of annular seats 58 and 59. Upon these seats rests an annular disc 61, similar to the disc 37 employed in the structures disclosed by Figs. 1 and 2 except for the provision therein of a centrally disposed opening adapted for the projection therethrough of a cylindrical boss 62 extending upwardly from the central portion of the valve plate in concentric relation to the seats 58 and 59.

The cage 26 in this structure has substantially all portions thereof in the same plane, except for the upwardly projecting portions forming the bead 27, and is disposed with the edges thereof beneath the head 13 in a recess formed within the surface of the valve plate 21. The valve plate is further recessed beneath the cage 21 to provide for the operation of the annular disc 61 upon the seats 58 and 59.

The disc 61 is resiliently retained in position by means of a spring which is substantially identical to the spring 38 employed in the structures previously described.

The cage 26 does not embrace the upwardly projecting flange 29 employed in the structures shown in Figs. 1 and 2 but has instead thereof a centrally disposed opening in which the upper end of the boss 62 is received.

In the suction valve structure there is employed, instead of the disc 43, an annular disc 63 through which extends a portion 65 of a tubular retaining cup or member 64 which is compressed against the outer surface of the annular disc to provide a head 66. The member 64 except for the formation of the end thereof extending through the annular disc 63, is substantially identical to the tubular member 48 employed in the preceding structures. As illustrated by Fig. 7, the cup 64 and annular disc 63 are assembled in the piston 12 outside of the cylinder 11 by the employment of tools 67 and 68. The tool 67 is substantially cylindrical in formation and is of a size such that the end thereof substantially fits the inside of the cup 64. Disposed within an axial opening 70 formed in the tool 67 is a cylindrical plug 69 which is resiliently supported within the opening upon a spring 71. The plug 69 is of such cross sectional dimensions as substantially to fit the projection 65 extending from the cup before the projection is collapsed.

In assembling the valve the cup 64 is placed upon the end of the tool 67 with the plug 69 projecting within the projection 65 thereof. Thereafter the piston 12 is disposed upon the outside of the cup 64 and the annular disc 63 brought into position upon the outside of the piston and upon the shoulder formed between the cup and the projection therefrom. With the elements in such position the tool 68 is forcibly pressed against the outer end of the projection 65 and the latter thereby is collapsed upon the outside of the annular disc 63 to provide the head 66 as the plug 69 is forced inwardly against the compression of the spring 71. Thus assembled the piston and suction valve unit is ready for employment within the cylinder 11.

In order to compensate for the location of the head 66 in a region slightly above the disc 63 the valve plate 21 is provided with a circular recess 72 adapted to receive and closely to fit the head when the piston is positioned at the upper limit of its travel.

In other respects the construction and operation of the structure disclosed by Fig. 3 is substantially the same as that of the structures disclosed by Figs. 1 and 2 and the same reference numerals are employed thereon wherever applicable.

Although the structures herein disclosed constitute preferred forms and applications of the invention, it is to be understood that other modified and equivalent structures differing widely from those herein disclosed, are within the scope of the invention as defined by the appended claims.

I claim:

1. A compressor structure comprising a cylinder, a reciprocating piston therein, a valve within said piston having a tubular retaining portion fixed thereto and means associated with said valve for conducting substantially all the fluid operated upon by said compressor, through said tubular retaining portion.

2. A compressor structure comprising a cylinder having a wall provided with an opening therein, a valve for closing said opening and a tubular apertured guide member slidably disposed in said opening and rigidly secured to said valve.

3. A compressor structure comprising a cylinder having a wall provided with an opening for the passage of fluid operated upon by the compressor, a valve for controlling the flow of fluid through said opening, a retaining member for said valve and having an outwardly projecting flange engaging said wall on the side thereof opposite said valve, said flange having spaced irregular surface portions thereon for limiting the amount of surface of said flange in contact with said wall.

4. A compressor structure comprising a cylinder having a wall provided with an opening therein for the passage of fluid operated upon by said compressor, a flexible valve controlling the flow of fluid through said opening, a tubular retaining member for said valve, said retaining member having arcuate slots formed therein between which are provided radially disposed lugs for engagement with said valve and means associated with said retaining member for limiting the operational movement of said valve.

5. A compressor structure comprising a cylinder having a wall provided with an opening for the passage of fluid operated upon by said compressor, a valve for controlling the flow of fluid to said opening, and a tubular apertured retaining member having a radially inwardly directed flange welded to said valve, for controlling the operational movement thereof.

6. A compressor structure comprising a cylinder having a wall provided with an opening therein for the passage of fluid operated upon by said compressor, an annular valve for controlling the flow of fluid through said opening, a tubular apertured retaining member for said valve, said tubular retaining member having a projection providing a head engaging the opposite surface of said annular valve.

7. A compressor structure comprising a cylinder having a wall provided with an opening for the passage to said cylinder of fluid operated upon by said compressor, an annular seat surrounding said opening, a valve engaging said annular seat, a tubular retaining member rigidly secured to said valve and projecting through said opening, said tubular retaining member having openings formed therein for the passage of fluid through said tubular member and between said seat and said valve, the hollow interior of said tubular member forming a main passageway for said fluid.

8. A compressor structure comprising a cylinder, an annular seat formed around one extremity thereof, a disc extending across said cylinder and engaging said seat, a tubular retaining member for said disc having an outwardly projecting flange, a valve cage having a flanged end for limiting the movement of said disc and retaining member, said cage also having an edge portion engaging said cylinder in a recess formed outwardly of the aforesaid seat, and a head for said cylinder engaging said edge portion for retaining said cage in position.

9. A valve structure including, in combination, a member having an opening therethrough, a valve disc seated on said member at one end of said opening, a tubular guide fixed to said disc and guided in said opening, said guide projecting through said opening and being apertured adjacent said disc, and an outwardly directed flange on the other end of said guide engageable with said member at the other end of said opening to limit axial movement thereof in one direction.

10. In a compressor structure, the combination of a cylinder, a valve plate secured upon one end thereof, a piston mounted for reciprocatory movement within said cylinder, and a disc valve operatively associated with said valve plate for controlling the discharge of working fluid from said cylinder, a valve in said piston for controlling the supply of fluid to said cylinder, said latter valve having a tubular retaining member for limiting the operational movement thereof, said tubular member being provided with openings therein defining a means of communication between regions of said cylinder on the opposite sides of said piston for admitting working fluid for compression in said cylinder in response to the operation of said compressor.

JOHN R. REPLOGLE.